United States Patent [19]

Sawada et al.

[11] Patent Number: 5,100,720
[45] Date of Patent: Mar. 31, 1992

[54] LAMINATED FILM HAVING GAS BARRIER PROPERTIES

[75] Inventors: Tsutomu Sawada; Shinichi Ohashi; Shigenobu Yoshida, all of Tsuchiura, Japan

[73] Assignee: Mitsubishi Monsanto Chemical Company Limited, Tokyo, Japan

[21] Appl. No.: 253,756

[22] Filed: Oct. 5, 1988

[30] Foreign Application Priority Data

Oct. 7, 1987 [JP] Japan .............................. 62-252722
Jan. 18, 1988 [JP] Japan .............................. 63-7977
Jul. 25, 1988 [JP] Japan .............................. 63-185113

[51] Int. Cl.⁵ .............................................. B32B 7/02
[52] U.S. Cl. .................................... 428/215; 428/451; 428/448; 428/500
[58] Field of Search ................ 428/448, 500, 451, 215

[56] References Cited

U.S. PATENT DOCUMENTS

| | | | |
|---|---|---|---|
| 4,363,840 | 12/1982 | Roullet et al. | 428/516 |
| 4,410,582 | 10/1983 | Tsunashima et al. | 428/516 |
| 4,478,874 | 10/1984 | Hahn | 428/430 |
| 4,552,791 | 11/1985 | Hahn | 428/451 |
| 4,684,553 | 4/1987 | Sasaki et al. | 428/430 |
| 4,835,061 | 5/1989 | Ohta et al. | 428/480 |

*Primary Examiner*—Edith L. Buffalow

[57] ABSTRACT

A gas barrier laminated film comprising a thermoplastic film having a polar group and a thin silicon oxide layer formed on the one side of the thermoplastic film in which the bond energy of silicon in the silicon oxide layer varies along the direction of the thickness of the layer and becomes large in the vicinity of the plastic film. It has a high level of gas barrier properties for steam and oxygen and is suitable for a variety of packaging materials.

5 Claims, 2 Drawing Sheets

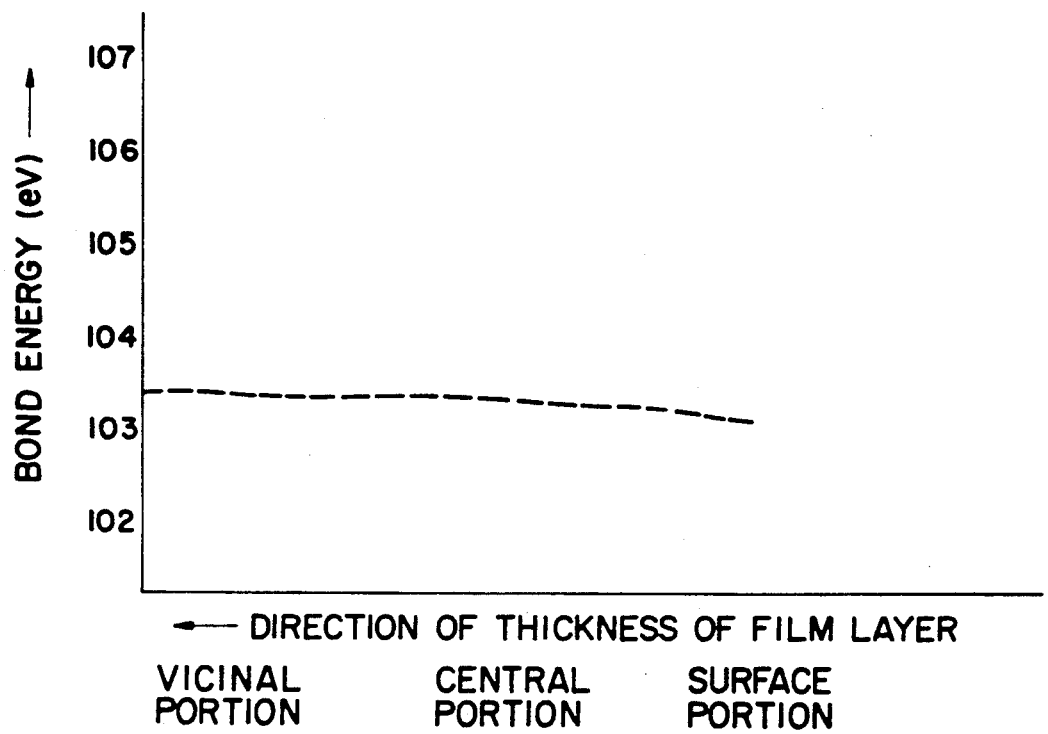
F I G. 3
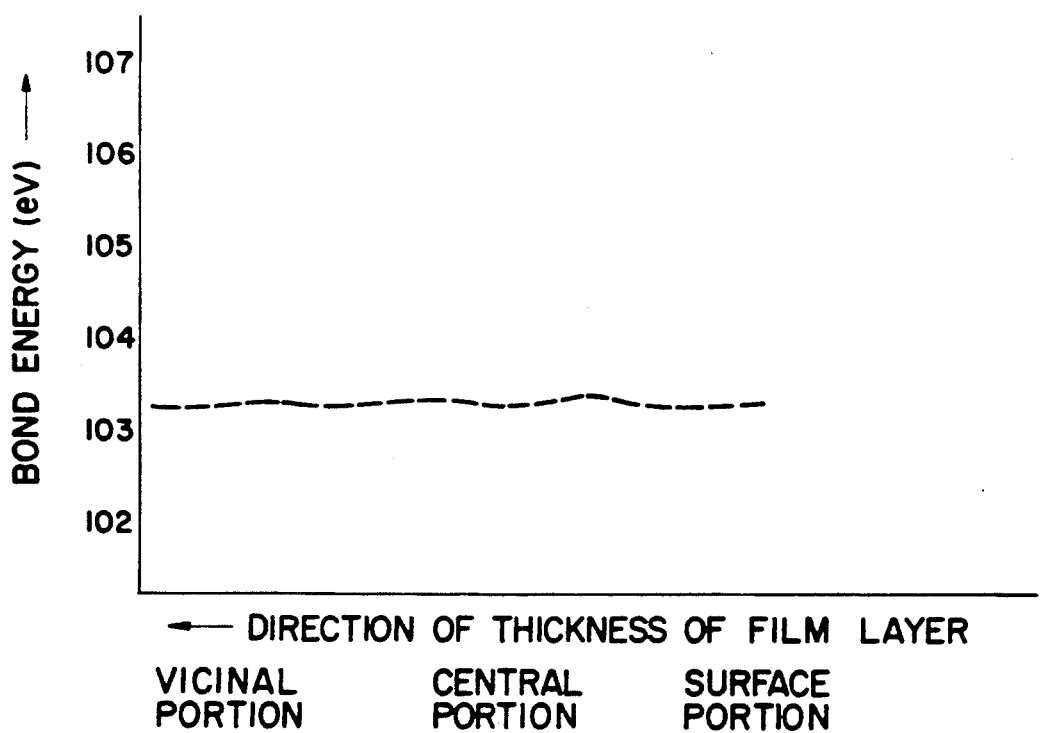
F I G. 4

LAMINATED FILM HAVING GAS BARRIER PROPERTIES

BACKGROUND OF THE INVENTION

The present invention relates to a laminated thermoplastic film having excellent gas barrier properties. More particularly, it relates to a laminated plastic film which has a high gas barrier property against steam and oxygen as well as transparency and is suitable for a variety of packaging materials.

Plastic films and their molded pieces used for packaging materials of foods, pharmaceuticals, chemicals and the like are made of gas barrier materials which are impermeable to gases such as steam, oxygen or the like in order to prevent the change of properties of a packaged content. In packages which require a high level of impermeability to gases, materials which have been additionally laminated with a metal foil such as aluminium or the like or on which metal such as aluminum or the like has been deposited are used.

Films made of a polyvinylidene chloride or a vinylidene chloride type resin such as a copolymer of vinylidene chloride as a main component and other monomers copolymerizable with vinylidene chloride such as vinyl chloride, methyl acrylate, methyl methacrylate, acrylonitrile or the like or vinylidene chloride type resin coated films in which films made of polypropylene, polyester, polyamide or the like have been coated with the vinylidene chloride type resin are also known as packaging materials having gas barrier properties.

Furthermore, a polyvinyl alcohol type resin such as polyvinyl alcohol or an ethylene-vinyl alcohol copolymer is also a material excellent in oxygen barrier properties. However, the polyvinyl alcohol type resin is inferior in steam barrier properties, and oxygen barrier properties are also deteriorated under a high humidity. Thus, when it is intended to use as a packaging material, it is usually formed into a laminated film that a steam barrier resin film made of polypropylene, polyethylene, polyester or the like has been laminated on the polyvinyl alcohol type resin film.

It has been proposed to afford gas barrier properties to a plastic film having an excellent mechanical strength by depositing a metal oxide film. There are, for example, films that silicon oxide has been deposited on a biaxially oriented nylon film or a biaxially oriented polyester film (Japanese Patent Publication No. 12953/1978) or that magnesium oxide has been deposited on a polyethylene terephthalate film or a biaxially oriented polypropylene film (Unexamined Published Japanese Patent Application No. 27532/1985).

Conventional packaging materials which use a metal foil or a metal deposition film are excellent in gas barrier properties to steam or oxygen, but these materials are always opaque because of the lamination of the metal. Accordingly, contents cannot be observed from the outside of the packaging material, and their use as packaging materials is limited within very narrow region.

On the other hand, conventional vinylidene chloride type resin films and polyvinyl alcohol type resin films can be formed transparent, but these films are not satisfactory in gas barrier properties to steam and oxygen. When these films are used for packaging materials which require a high level of gas barrier properties, the thickness of the films must be increased. However, if the thickness of the films is increased, the transparency or softness will be impaired. Accordingly, these films are inadequate to packaging materials which require a high level of gas barrier properties.

Further, a packaging material that a metal oxide film is deposited on a plastic film to afford gas barrier properties is also insufficient for gas barrier properties. Accordingly, it is unsatisfactory for the use which requires a high level of gas barrier properties.

SUMMARY OF THE INVENTION

The present invention has been done on the basis of the aforementioned background, and the object of the present invention is to provide a gas barrier laminated plastic film which has a high level of gas barrier properties without increasing the thickness of the film and can exhibit excellent transparency.

We have conducted a variety of researches for the purpose of solving foregoing problems. As a result thereof, we have found that the formation of a thin silicon oxide layer having a large bond energy of silicon at a bonding portion on the surface of a thermoplastic film having a polar group is effective for achieving the object of the present invention. Thus, we have completed the present invention.

That is to say, the gas barrier laminated film according to the present invention comprises a thermoplastic film having a polar group and a thin layer of silicon oxide formed on the one side of the thermoplastic film, in which the bond energy of silicon in the silicon oxide of the layer varies along the direction of the thickness of the layer and has a large value in the vicinity of the plastic film.

In a preferred embodiment of the present invention, there can be used as a thermoplastic film a polyvinyl alcohol film which has a saponification value of 99% or more and has been stretched monoaxially five folds or more.

In a further preferred embodiment of the present invention, there can be used as a thermoplastic film a stretched polyvinyl alcohol film which has a saponification value of 99% or more and the dimensional variation rate of 2% or less at the temperature of 120° C.

In a still further preferred embodiment of the present invention, the thin layer of silicon oxide can be formed by any one of a vacuum deposition method, a spattering method or an ion plating method.

In another preferred embodiment of the present invention, a further plastic layer can be laminated on the surface of the film layer.

In the present invention comprising the aforementioned constructions, the bond energy of silicon is large in the vicinity of the bonding portion of the thermoplastic film having a polar group and the silicon oxide layer. This indicates that the surface of the thermoplastic film and the thin layer are strongly bonded and that the network of atoms at the strong bonding portion makes gas molecules such as water molecules or oxygen molecules substantially less permeable and thus exhibits excellent gas barrier properties. This explanation is proposed for the better understanding of the present invention and does not intend to limit the scope of the present invention.

The present invention has following effects as will be illustrated in the following examples.

The gas barrier laminated plastic film according to the present invention has an extremely high level of gas barrier properties without increasing the thickness of the film and can exhibit an excellent transparency. It also has a softness and is excellent in strength and economy.

Accordingly, the gas barrier laminated plastic film according to the present invention can be used as a packaging material for foods, pharmaceuticals, chemicals or the like, and it can also be applied to packaging which requires a high level of gas barrier properties. Thus, it can be used for applications over a wide range and has a large usefulness in industry.

In the gas barrier laminated plastic film according to the preferred embodiment of the present invention, a plastic layer is further formed in lamination, and thus it is possible to exhibit more excellent gas barrier properties by further lowering the moisture permeability.

In the gas barrier laminated plastic film according to the preferred embodiment of the present invention, a thermoplastic film having a polar group such as a hydroxyl, e.g. a polyvinyl alcohol type film, is used, so that if a thin layer of silicon oxide is formed on this film by a vacuum deposition method or the like, the polar group of the plastic film and the silicon oxide interact at an initial stage of the formation to give a larger bond energy of silicon in the vicinity of the plastic film. Thus, there can be obtained a film which exhibits excellent gas barrier properties.

In the gas barrier laminated plastic film according to the preferred embodiment of the present invention, as a stretched polyvinyl alcohol film, more preferably a stretched polyvinyl alcohol film having a dimensional stability even at high temperature is used, a transparent laminated plastic film having an extremely excellent strength can be obtained.

BRIEF DESCRIPTION OF THE DRAWINGS

FIG. 3 is a graph which illustrates the variation of the bond energy of silicon to the direction of thickness of the thin silicon oxide layer in the laminated film obtained in Comparative Example C1; and FIG. 4 is a graph which illustrates the variation of the bond energy of silicon to the direction of thickness of the thin silicon oxide layer in the laminated film obtained in Comparative Example C2.

DETAILED DESCRIPTION OF THE INVENTION

Bond Energy of Silicon

Figure 1:
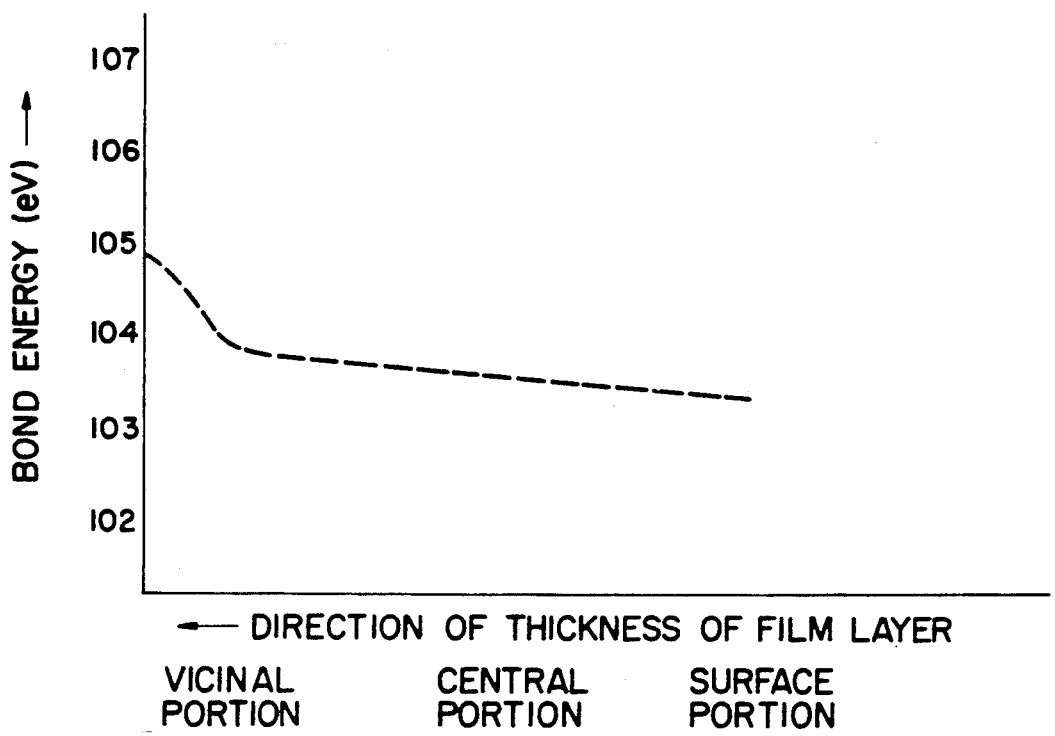
FIG. 1 is a graph which illustrates the variation of the bond energy of silicon to the direction of thickness of the thin silicon oxide layer in the laminated film obtained in Example C1 according to the present invention.

In the gas barrier laminated film according to the present invention, a thin layer of silicon oxide which is formed on the one side of a thermoplastic film having a polar group has a large bond energy of silicon in the vicinity of the bonding portion to the thermoplastic film.

This is, as is seen hereinafter, because a thin layer of a silicon oxide of which the bond energy of silicon in the vicinity of a thermoplastic film is lesser than or same as that in the central portion or the surface portion which does not bond to the thermoplastic film will not improve the gas barrier properties sufficiently.

In this specification, the phraseology "bond energy of silicon in the silicon oxide" means the bond energy of $Si2p$ measured by the ESCA (Electron Spectroscopy for Chemical Analysis) method.

The bond energy of silicon $Si2p$ in the direction of the thickness of thin silicon oxide layer can be measured by the ESCA method with etching the exposed layer with an argon ion or the like.

The bond energy of silicon in the vicinity of the thermoplastic film is desirably 0.3 eV or more, preferably 0.5 eV or more larger than that in the central portion and the surface portion of the thin layer which are out of contact with the thermoplastic film.

Formation of the Silicon Oxide Layer

The thin layer of silicon oxide can be formed by depositing on the surface of a plastic film by either method of the vacuum deposition method, the spattering method or the ion plating method with the use of a deposition material such as silicon monoxide, silicon dioxide or a mixture thereof.

For example, in the case of the vacuum deposition method, silicon monoxide or silicon dioxide is used as a deposition material and vaporized with heating under a vacuum of $10^{-3}$ to $10^{-5}$ Torr by heating with such a method as electron beam heating, high frequency induction heating or resistance heating.

In the present invention, the method for forming the thin layer is not limited to those described above, and a variety of methods can be applied. For example, it is also possible to use the reaction deposition method which is conducted with the use of deposition materials such as silicon, silicon monoxide, silicon dioxide or a mixture thereof with supplying oxygen gas. In this case, the plastic film as a film to be deposited may be the one which has been subjected to final setting treatment or the one which has been subjected to only one step of the thermal setting treatment. In the latter case, the plastic film is placed in a deposition chamber and subjected to the second thermal setting treatment to afford dimensional stability prior to deposition, and then the film is subjected to deposition treatment.

The thin layer of silicon oxide formed on the thermoplastic film has a thickness of 3 to 700 nm, preferably 5 to 500 nm. This is because the gas barrier properties is insufficient at the thickness of the thin layer of less than 5 nm, an its tendency becomes striking at the thickness of less than 3 nm; on the other hand, the thin layer may warp or the thin layer may be cracked or separated to impair the flexibility at the thickness exceeding 500 nm, and its tendency becomes striking at the thickness exceeding 700 nm.

In the thin layer of silicon oxide, additives can be included appropriately according to the necessity. If the amount of the additives is maintained at the level of 10% by weight or less, the contamination of calcium, magnesium or an oxide thereof as impurities will not affect deleteriously the layer.

Thermoplastic Film

The plastic film used in the present invention is a thermoplastic having a polar group which can deposit and bond the thin layer of silicon oxide and the thermoplastic film so that the bond energy of silicon becomes large in the vicinity of the two.

Specifically, the thermoplastic film having a polar group is a polyvinyl alcohol type resin such as polyvinyl alcohol, an ethylene-vinyl alcohol copolymer film or the like; and a polyvinyl acetal type resin such as polyvinyl formal, polyvinyl butyral or the like.

The polyvinyl alcohol used in the present invention is desirably the one having a saponification value of 99% or more. This is because the improvement of the gas barrier properties cannot be much expected at a saponification value of less than 99%.

The size or shape of the thermoplastic film is selected appropriately. The film may be any one of the unstretched or stretched monoaxially or biaxially. However, when a polyvinyl alcohol type resin is used, a polyvinyl alcohol having been stretched at least monoaxially at a stretch ratio of 5 or more is desirable.

This is because the gas barrier properties are further improved on the stretch ratio of 5 or more. In this stretching embodiment, the film may be the one which is stretched monoaxially or biaxially. It is not limited to a film which has been stretched in one step and may be the one having been stretched in multi-steps if the stretch ratio is in the range where the total stretch ratio is 5 or more.

The plastic film used in the present invention is preferably a stretched polyvinyl alcohol film having a dimensional variation rate of 2% or less at a temperature of 120° C. If the dimensional variation rate exceeds 2%, the gas barrier properties will not be improved appreciably even though the thin layer of silicon oxide is formed on the surface of the plastic film by the vacuum deposition method, the spattering method or the ion plating method. The mechanism being ambiguous can be presumed that the polyvinyl alcohol film is heated on the formation of the thin layer and is shrinked or expanded to change its dimension, and if the dimensional variation rate exceeds 2%, cracking, uneven thickness or pinhole is generated in the thin layer of the silicon oxide and thus a uniform dense thin layer will not be obtained.

In order to obtain the dimensional stability, the polyvinyl alcohol is stretched and then set thermally at a temperature from its glass transition point to its melting point, so that the crystallinity is increased and the orientation of the molecular chain is set.

The thermal setting operation can be performed in one step or in multi-step. When performed in two steps, the thermal setting in the latter step is preferably conducted at a temperature of 120° C. or less. As the thermal setting operation in the latter step, it is possible to use a method that a stretched film is moistened under a high humidity condition, an orientation stress is relaxed in the plasticized state, and the moisture having been absorbed in the film is removed by drying with heating.

The thermoplastic film on which the thin layer of silicon oxide has a thickness of 5 to 400 μm, preferably 10 to 200 μm.

Plastic Layer

In a preferred embodiment of the present invention, on the other surface of the silicon oxide layer on the one surface of which a plastic layer is laminated can be further laminated the same or different plastic layer.

As the laminating method, there is a method that a plastic layer is laminated on the surface of the silicon oxide layer or a plastic layer is coated on the surface of the silicon oxide layer.

The plastic layer used for lamination is not critical, but it is preferably a layer which has a moisture permeability of 50 g/m$^2$·24 hr measured under the conditions of the temperature of 40° C. and the relative humidity of 90% in accordance with ASTM F372. The thickness can be selected in the range of 5 to 400 μm.

As the plastic material suitable for laminating the plastic layer, there are mentioned an olefin resin such as polyethylene and an ethylene type copolymer, and polypropylene and a propylene type copolymer; a polyvinyl chloride type resin such as polyvinyl chloride and a copolymer thereof; a polyvinylidene chloride such as polyvinylidene chloride and a copolymer thereof; a polyester resin such as polyethylene terephthalate or the like; a fluorine resin such as polytetrafluoroethylene or the like; or a coated film that one of the resin films specified above is coated with the other resin such as a polyvinylidene chloride type resin. These resin film may be any one of the unstretched or the stretched monoaxially or biaxially.

When the plastic layer is laminated, well known methods such as the dry laminating method or the extrusion laminating method which use an urethane type adhesive, an acrylic adhesive, a polyester type adhesive or the like can be used.

On the other hand, when a plastic material is coated into layer, a coating agent is used. In this case, the coating agent suitably used is preferably a solution or a dispersion of a polyvinylidene type resin such as polyvinylidene chloride and a copolymer thereof, a polyester resin such as polyethylene terephthalate and the like, and a fluorine resin such as polytetrafluoroethylene and the like.

When a plastic material is coated into layer, an anchor-coat can be used in order to enhance the adhesion strength of the coating and the thin layer. As the suitable anchor-coat, there can be mentioned adhesion promoters of the isocyanate type, the polyethyleneimine type, the organotitanium type or the like and adhesives of the polyurethane·type, the polyester type or the like.

In the present invention, in addition to the members such as the silicon oxide layer and the foregoing plastic layer having been formed on the surface of the thermoplastic film, a substance which enhances heat-sealing properties of the film can be coated or laminated on the surface of the thin layer, the surface of the plastic layer, the surface of the plastic coating or both the surfaces according to its usage.

As the substance for enhancing the heat-sealing properties, there are, for example, a low density polyethylene, an ethylene-vinyl acetate copolymer, a polypropylene, an ionomer and the like.

EXAMPLE

The present invention is specifically explained in the following in reference to Examples and in comparison with Comparative Examples. However, the present invention is not limited to the following Examples unless it exceeds its gist.

In the following Examples, the dimensional variation rate of the thermoplastic film (polyvinyl alcohol film), the bond energy of silicon (Si2p) of the thin layer, the moisture permeability of the laminated film obtained, the oxygen permeability and the transparency were measured or evaluated by the following methods. The thickness of the thin layer of silicon oxide is measured by a rock crystal film thickness meter.

Dimensional variation rate of a polyvinyl alcohol film

A sample piece of a square having a side length of 120 mm was prepared from the film and conditioned under the atmosphere at the temperature of 23° C. and the relative humidity of 50% for 24 hours, and then a line in the shape of a square having a side length of 100 mm was marked on the sample piece. It was placed in the constant temperature air bath adjusted at a temperature of 120° C., taken out from the bath after 5 minutes and conditioned at the atmosphere at the temperature of 23° C. and the relative humidity of 50% for 24 hours, and then the absolute value of the variation of the distance of the square mark line ($\Delta l$: mm) was measured to obtain the dimensional variation rate by calculating from the following equation:

$$\text{Dimensional variation rate} = \frac{\Delta l}{100} \times 100 \, (\%)$$

Bond energy of silicon

Using an X-ray photospectroscopic analyzer (manufactured by Shimazu Seisakusho, Ltd.; ESCA Model 850, X-ray source: MgK$\alpha$), the variation of the bond energy of Si2p in the direction of the thickness was measured by etching the silicon oxide layer with an Ar$^+$ ion with an interval of 3 minutes.

Moisture permeability

In accordance with ASTM F-372, measurement was conducted under the condition of the temperature of 40° C. and the relative humidity of 90% (i) in the case of a transparent plastic film on the one side of which only a thin layer of the silicon oxide was formed by standing the thin layer of the silicon oxide at the high humidity side (90% RH) and the plastic film at the side of an absolutely dry state; and (ii) in the case of a transparent film on the surface of the silicon oxide layer of which another plastic coating other than the foregoing film was formed, measurement was conducted by standing the surface of the plastic coating at the high humidity side (90% RH) and the plastic film at the side of an absolutely dry state.

Oxygen permeability

Using an oxygen permeability meter (manufactured by MODERN CONTROL CO., Model OX-TRAN100), measurement was performed under the conditions of the temperature of 30° C. and the relative humidity of 80%.

Transparency

Evaluation was performed by naked eye, and the samples having a good transparency were marked by ⊚.

EXAMPLE A1

A transparent gas barrier laminated film was obtained by evaporating by heating silicon monoxide (SiO) having a purity of 99.9% under a vacuum of $5 \times 10^{-5}$ Torr and forming a thin silicon oxide layer of a thickness of 100 nm silicon oxide on the one side of a polyvinyl alcohol film having a saponification value of 99.9% (stretch ratio: 5, monoaxially stretched, thickness: 20 $\mu$m).

As for the gas barrier laminated film, the moisture permeability and the oxygen permeability were measured by the aforementioned methods, and the transparency was evaluated by a naked eye.

The results of measurements are specified in Table 1.

EXAMPLE A2

A thin layer of the silicon oxide was formed on the one side of the polyvinyl alcohol film in the same manner as in Example A1 except that a polyvinyl alcohol film having a saponification value of 99.9% and a stretch ratio of $3 \times 3$ was further stretched monoaxially to the stretch ratio of $3 \times 8.7$ to give a thickness of 25 $\mu$m.

As for the gas barrier laminated film obtained, evaluation tests were conducted for the same items as in Example A1. The results are specified in Table 1.

EXAMPLES A3 and A4

Laminated films were obtained in the same manner as in Example A1 except that the thicknesses of the thin layers of the silicon oxide formed on the one side of the polyvinyl alcohol film were made 50 nm (Example A3) and 200 nm (Example A4), respectively.

As for the laminated films obtained, evaluation tests were conducted for the same items as in Example A1. The results are specified in Table 1.

EXAMPLE A5

A laminated film was obtained by forming a thin layer of the silicon oxide having a thickness of 100 nm on the one side of the polyvinyl alcohol film in the same manner as in Example A1 except that a silicon dioxide having a purity of 99.9% was used instead of the silicon oxide having a purity of 99.9%.

As for the gas barrier laminated film obtained, evaluation tests were conducted for the same items as in Example A1. The results are specified in Table 1.

COMPARATIVE EXAMPLES A1-A3

Laminated films were obtained by forming a thin layer of silicon oxide having a thickness of 100 nm on the one side of the films in the same manner as in Example A1 except that the polyvinyl alcohol film was replaced by a biaxially stretched polyethylene terephthalate film (stretch ratio: $3 \times 3$) having a thickness of 25 $\mu$m (Comparative Example A1), a biaxially stretched polyvinyl alcohol film (stretch ratio: $3 \times 3$) having a saponification value of 99.9% and a thickness of 25 $\mu$m (Comparative Example A2) and a monoaxially stretched polyvinyl alcohol film (stretch ratio: 5) having a saponification value of 99.0% and a thickness of 20 $\mu$m (Comparative Example A3), respectively.

As for the laminated films obtained, evaluation tests were conducted for the same items as in Example A1. The results are specified in Table 1.

EXAMPLE A6

A transparent gas barrier laminated plastic film was obtained by laminating on the surface of the deposited silicon oxide of the transparent gas barrier laminated film which had been formed in Example A1 a polypropylene film having a vinylidene chloride type resin coat layer (thickness: 10 $\mu$m) and a total thickness of 30 $\mu$m (stretch ratio: $5 \times 5$, moisture permeability: 1.2 g/m$^2$·24 hr, referred to hereinafter as "K-OPP") so that the vinylidene chloride type resin coat layer and the silicon oxide deposited surface are contacted through an urethane type adhesive layer having a thickness of 2 $\mu$m (manufactured by Takeda Chemical Industries, Ltd., a two-component type adhesive comprising mixing TAKELAK A-606 and TAKENAT A-10 in a proportion of 9:1).

As for the transparent gas barrier laminated film, the moisture permeability and the oxygen permeability were measured and the transparency was evaluated by naked eyes.

The results of the measurements are specified in Table 2.

EXAMPLE A7

A transparent gas barrier laminated plastic film was obtained by laminating on the surface of the polyvinyl alcohol of the transparent gas barrier laminated film which was obtained in Example A6 a low density polyethylene film (thickness: 40 $\mu$m) through an urethane type adhesive layer having a thickness of 2 $\mu$m (manufactured by Takeda Chemical Industries, Ltd., a two-component type adhesive comprising mixing TAKELAK A-606 and TAKENAT A-10 in a proportion of 9:1).

As for the transparent gas barrier laminated film, the moisture permeability and the oxygen permeability were measured and the transparency was evaluated by naked eyes.

The results of the measurements are specified in Table 2.

EXAMPLE A8

A laminated film was obtained in the same manner as in Example A6 except that the K-OPP film laminated on the silicon oxide deposited surface of the transparent laminated film in Example A6 was replaced by a biaxially stretched polyethylene terephthalate film (stretch ratio: 3×3) having a thickness of 25 $\mu$m (moisture permeability: 20 g/m$^2$·24 hr).

As for the laminated films obtained, evaluation tests were conducted for the same items as in Example A6.

The results are specified in Table 2.

EXAMPLE A9

A laminated film was obtained in the same manner as in Example A7 except that the laminated film obtained in Example A8 was used instead of the laminated film obtained in Example A6.

As for the laminated films obtained, evaluation tests were conducted for the same items as in Example A6.

The results are specified in Table 2.

EXAMPLE A10

A laminated film was obtained in the same manner as in Example A6 except that the K-OPP film laminated on the silicon oxide deposited surface of the transparent laminated film obtained in Example A6 was replaced by a biaxially stretched nylon 6 film (stretch ratio: 3×3) having a thickness of 15 $\mu$m (moisture permeability: 150 g/m$^2$·24 hr).

As for the laminated films obtained, evaluation tests were conducted for the same items as in Example A6.

The results are specified in Table 2.

EXAMPLE A11

A laminated film was obtained in the same manner as in Example A7 except that the laminated film obtained in Example A10 was used instead of the laminated film obtained in Example A6.

As for the laminated films obtained, evaluation tests were conducted for the same items as in Example A6.

The results are specified in Table 2.

EXAMPLE A12

On the silicon oxide deposited surface of the transparent gas barrier laminated film obtained in Example A2 was coated in the first place as an anchor-coating an urethane type adhesive layer (manufactured by Takeda Chemical Industries, Ltd., a two-component type adhesive comprising mixing TAKELAK A-606 and TAKENAT A-10 in a proportion of 9:1) to form a coat layer having a thickness of 1 $\mu$m. Then, a vinylidene type resin latex (manufactured by Kureha Chemical Industry Co., Ltd.; KUREHARON LATEX DO-870) was coated on the coat layer to give a film having a thickness of 10 $\mu$m (moisture permeability: 20 g/m$^2$·24 hr; referred to hereinafter as "K film"). Thus, a transparent gas barrier laminated plastic film was obtained.

As for the transparent gas barrier laminated film, the moisture permeability and the oxygen permeability were measured in the methods described above and the transparency was evaluated by naked eyes.

The results of the measurements are specified in Table 2.

EXAMPLE A13

A transparent gas barrier laminated plastic film was obtained by laminating on the silicon oxide deposited surface of the transparent gas barrier laminated film obtained in Example A2 the same K-OPP as used in Example A6 so that the vinylidene chloride type resin coat layer and the silicon oxide deposited surface and the surface of the polyvinyl alcohol film and a low density polyethylene film (thickness: 40 $\mu$m) were contacted respectively through an urethane type adhesive layer having a thickness of 2 $\mu$m (manufactured by Takeda Chemical Industries, Ltd., a two-component type adhesive comprising mixing TAKELAK A-606 and TAKENAT A-10 in a proportion of 9:1).

As for the transparent gas barrier laminated film, the moisture permeability and the oxygen permeability were measured and the transparency was evaluated by naked eyes.

The results of the measurements are specified in Table 2.

COMPARATIVE EXAMPLE A4

A laminated film was obtained in the same manner as in Example A13 except that the laminated film obtained in Comparative Example A1 was used instead of the laminated film obtained in Example A2, wherein the low density polyethylene film was laminated on the surface of the polyethylene terephthalate.

As for the transparent gas barrier laminated film, the moisture permeability and the oxygen permeability were measured and the transparency was evaluated by naked eyes.

The results of the measurements are specified in Table 2.

TABLE 1

| Example No. | Construction of Laminated Films | | | | | Total thickness (μm) | Moisture permeability (g/m² · 24 hr) | Oxygen permeability (cc/m² · 24 hr · atm) | Transparency |
|---|---|---|---|---|---|---|---|---|---|
| | Silicon Oxide Film Layer | | Plastic Film | | | | | | |
| | Deposition material | Thickness (nm) | Material | Saponification value (mole %) | Stretch ratio | | | | |
| Exam. A1 | SiO | 100 | PVA*¹ | 99.7 | 1 × 5 | 20 | 1.5 | 0.2 or less | ⊚ |
| Exam. A2 | SiO | 100 | PVA | 99.9 | 3 × 8.7 | 25 | 1.0 | 0.2 or less | ⊚ |
| Exam. A3 | SiO | 50 | PVA | 99.9 | 3 × 8.7 | 25 | 1.5 | 0.2 or less | ⊚ |
| Exam. A4 | SiO | 200 | PVA | 99.9 | 3 × 8.7 | 25 | 0.8 | 0.2 or less | ⊚ |
| Exam. A5 | SiO₂ | 100 | PVA | 99.7 | 1 × 5 | 20 | 2.0 | 0.2 or less | ⊚ |
| Comp. Exam. A1 | SiO | 100 | PET*² | — | 3 × 3 | 25 | 8.0 | 5 | ⊚ |
| Comp. Exam. A2 | SiO | 100 | PVA | 99.9 | 3 × 3 | 25 | 15.0 | 1 | ⊚ |
| Comp. Exam. A3 | SiO | 100 | PVA | 90.0 | 1 × 5 | 20 | 50.0 | 8 | ⊚ |

*¹PVA Polyvinyl alcohol.
*²PET Polyethylene terephthalate.

TABLE 2

| Example No. | Construction of Laminated Films | Total thickness (μm) | Moisture permeability (g/m² · 24 hr) | Oxygen permeability (cc/m² · 24 hr · atm) | Transparency |
|---|---|---|---|---|---|
| Exam. A6 | K-OPP*¹/Film of Example A1 | 52 | 0.2 | 0.2 or less | ⊚ |
| Exam. A7 | K-OPP/Film of Example A1/LDPE*² | 94 | 0.3 | 0.2 or less | ⊚ |
| Exam. A8 | PET*³/Film of Example A1 | 47 | 0.4 | 0.2 or less | ⊚ |
| Exam. A9 | PET/Film of Example A1/LDPE | 89 | 0.5 | 0.2 or less | ⊚ |
| Exam. A10 | ONY*⁴/Film of Example A1 | 37 | 0.6 | 0.2 or less | ⊚ |
| Exam. A11 | ONY/Film of Example A1/LDPE | 79 | 0.7 | 0.2 or less | ⊚ |
| Exam. A12 | K film*⁵/Film of Example A2 | 36 | 0.15 | 0.2 or less | ⊚ |
| Exam. A13 | K-OPP/Film of Example A2/LDPE | 99 | 0.2 | 0.2 or less | ⊚ |
| Comp. Exam. A4 | K-OPP/Film of Comparative Example A1/LDPE | 99 | 1.0 | 4 | ⊚ |

*¹K-OPP Polyvinylidene chloride type resin coated biaxially stretched polypropylene film.
*²LDPE Low density polyethylene film.
*³PET Biaxially stretched polyethylene terephthalate film.
*⁴ONY Biaxially stretched nylon 6 film.
*⁵K film Polyvinylidene chloride type resin film.

EVALUATION OF THE RESULTS OF EXAMPLES A1-A13 AND COMPARATIVE EXAMPLES A1-A4

Followings are found from the results specified in Tables 1 and 2:

(i) From the results of Examples A1 to A5, more excellent gas barrier properties are exhibited by using a plastic film which has been stretched at least monoaxially in the stretch ratio of 5 or more.

If another plastic layer is laminated on the thin layer, the moisture permeability is further reduced and much excellent gas barrier properties are exhibited (Examples A6, A8, A10 and A12).

Further, the gas barrier properties were not changed even if a substance for improving heat-sealing properties was laminated (Examples A7, A9, A11 and A13).

(ii) The moisture permeability and the oxygen permeability were not good in cases that a film having a less amount of a polar group was used as a thermoplastic film (Comparative Example A1), that the stretch ratio was insufficient (Comparative Example A2) and that the saponification value was insufficient (Comparative Example A3).

(iii) The laminated films according to the present invention have excellent gas barrier properties and exhibit good transparency.

EXAMPLE B1

A polyvinyl alcohol film having a dimensional variation rate of 0.8% in one direction and 0.6% in the longitudinal direction was prepared by subjecting a polyvinyl alcohol film having a saponification value of 99.9% (stretch ratio: 3×3, biaxially stretched, thickness: 25 μm) to a thermal setting treatment at a temperature of 210° C. for 10 seconds. A transparent gas barrier laminated film was obtained by evaporating by heating silicon monoxide (SiO) having a purity of 99.9% under a vacuum of $5\times10^{-5}$ Torr and forming a thin silicon oxide layer of a thickness of 100 nm on the one side of a polyvinyl alcohol film.

As for the gas barrier laminated film, the moisture permeability and the oxygen permeability were measured by the aforementioned methods, and the transparency was evaluated by a naked eye.

The results of measurements are specified in Table 3.

EXAMPLE B2

A polyvinyl alcohol film having a dimensional variation rate of 1.7% in one direction and 0.9% in the longitudinal direction was prepared by further subjecting a polyvinyl alcohol film having a saponification value of 9.9% (stretch ratio: 3×3, biaxially stretched, thickness: 25 μm) to a monoaxial stretching to a stretch ratio of 2.1 to give a total stretch ratio of 3×6.3, a two-step thermal setting treatment at a temperature of 200° C. for 22 seconds and further at 80° C. for 1.5 hours. A transparent gas barrier laminated film was obtained by evaporating by heating silicon monoxide (SiO) having a purity of 99.9% under a vacuum of $5\times10^{-5}$ Torr and forming a thin silicon oxide layer of a thickness of 100 nm on the one side of a polyvinyl alcohol film.

As for the gas barrier laminated film, the moisture permeability and the oxygen permeability were measured by the aforementioned methods, and the transparency was evaluated by a naked eye.

The results of measurements are specified in Table 3.

EXAMPLE B3

A laminated film was obtained in the same manner as in Example B2 except that the same polyvinyl alcohol film as used in the above-described Example which had been subjected only to the thermal setting treatment at 200° C. for 22 seconds was charged in a vacuum deposition chamber and then the second thermal setting treatment was conducted at 100° C. for 5 minutes prior to the deposition operation (the dimensional variation rate of the film obtained being 0.4% in one direction and 0.3% in the vertical direction).

As for the laminated film obtained, the evaluation tests were conducted for the same items as in Example B2.

The results of measurements are specified in Table 3.

EXAMPLES B4 and B5

Laminated films were obtained in the same manner as in Example B3 except that the thickness of the transparent silicon oxide layer formed on the one side of the polyvinyl alcohol film was made 50 nm (Example B4) and 200 nm (Example B5), respectively.

As for the laminated film obtained, the evaluation tests were conducted for the same items as in Example B3.

The results of measurements are specified in Table 3.

COMPARATIVE EXAMPLE B1

A laminated film was obtained by forming on the one side of the polyvinyl alcohol film a thin silicon oxide layer of a thickness of 100 nm in the same manner as in Example B1 except that a biaxially stretched polyvinyl alcohol film having a saponification value of 90.0% was used instead of the biaxially stretched polyvinyl alcohol film having a saponification value of 99.0% used in the above-described Example.

As for the laminated film obtained, the evaluation tests were conducted for the same items as in Example B1.

The results of measurements are specified in Table 3.

COMPARATIVE EXAMPLE B2

A laminated film was obtained by forming on the one side of the polyvinyl alcohol film a thin silicon oxide layer of a thickness of 100 nm in the same manner as in Example B2 except that a polyvinyl alcohol film which had not been subjected to the second thermal treatment at 80° C. for 1.5 minutes (the dimensional variation rate being 3.0% in one direction and 1.5% in the vertical direction) was used instead of the polyvinyl alcohol film which had been subjected to the two-step thermal setting treatment in the above-described Example.

As for the laminated film obtained, the evaluation tests were conducted for the same items as in Example B2.

The results of measurements are specified in Table 3.

COMPARATIVE EXAMPLE B3

A laminated film was obtained by forming a thin layer of the silicon oxide having a thickness of 100 nm on the one side of the films in the same manner as in Example B1 except that the polyvinyl alcohol film used in said Example was replaced by a biaxially stretched polyethylene terephthalate film (stretch ratio: 3×3) having a thickness of 25 μm.

As for the laminated films obtained, evaluation tests were conducted for the same items as in Example B1.

The results are specified in Table 3.

EXAMPLE B6

A transparent gas barrier laminated plastic film was obtained by laminating on the surface of the deposited silicon oxide of the transparent gas barrier laminated film which had been formed in Example B1 a polypropylene film having a vinylidene chloride type resin coat layer (thickness: 10 μm) and a total thickness of 30 μm (stretch ratio: 3×10, moisture permeability: 1.2 g/m$^2$·24 hr, referred to hereinafter as "K-OPP") so that the vinylidene chloride type resin coat layer and the silicon oxide deposited surface are contacted through an urethane type adhesive layer having a thickness of 2 μm (manufactured by Takeda Chemical Industries, Ltd., a two-component type adhesive comprising mixing TAKELAK A-606 and TAKENAT A-10 in a proportion of 9:1).

As for the transparent gas barrier laminated film, the moisture permeability and the oxygen permeability were measured by the methods described above and the transparency was evaluated by naked eyes.

The results of the measurements are specified in Table 4.

EXAMPLE B7

A transparent gas barrier laminated plastic film was obtained by laminating on the surface of the polyvinyl alcohol of the transparent gas barrier laminated film which was obtained in Example B6 an ethylene-vinyl acetate copolymer film (thickness: 40 μm) as a heat-sealing layer through an urethane type adhesive layer having a thickness of 2 μm (manufactured by Takeda Chemical Industries, Ltd., a two-component type adhesive comprising mixing TAKELAK A-606 and TAKENAT A-10 in a proportion of 9:1).

As for the transparent gas barrier laminated film, the moisture permeability and the oxygen permeability were measured by the methods described above and the transparency was evaluated by naked eyes.

The results of the measurements are specified in Table 4.

EXAMPLE B8

A laminated film in which the K-OPP had been laminated by adhesion was obtained in the same manner as in Example B6 except that the laminated film obtained in Example B1 and used in Example B6 was replaced by a laminated film obtained in Example B3.

As for the laminated films obtained, evaluation tests were conducted for the same items as in Example B1.

The results are specified in Table 4.

EXAMPLE B9

A laminated film having been provided with a heat-sealing layer was obtained in the same manner as in Example B7 except that the laminated film obtained in Example B8 was used instead of the laminated film obtained in Example B6.

As for the laminated films obtained, evaluation tests were conducted for the same items as in Example B7.

The results are specified in Table 4.

EXAMPLE B10

A laminated film was obtained in the same manner as in Example B8 except that the K-OPP film laminated on the silicon oxide deposited surface of the transparent laminated film obtained in Example B8 was replaced by a biaxially stretched polyethylene terephthalate film (stretch ratio: 3×3) having a thickness of 25 μm (moisture permeability: 20 g/m$^2$·24 hr).

As for the laminated films obtained, evaluation tests were conducted for the same items as in Example B8.

The results are specified in Table 4.

EXAMPLE B11

A laminated film having been provided with a heat-sealing layer was obtained in the same manner as in Example B7 except that the laminated film obtained in Example B10 was used instead of the laminated film obtained in Example B6.

As for the laminated films obtained, evaluation tests were conducted for the same items as in Example B7.

The results are specified in Table 4.

EXAMPLE B12

A laminated film was obtained in the same manner as in Example B8 except that the K-OPP film laminated on the silicon oxide deposited surface of the transparent laminated film was replaced by a biaxially stretched nylon 6 film (stretch ratio: 3×3) having a thickness of 15 μm (moisture permeability: 150 g/m$^2$·24 hr).

As for the laminated films obtained, evaluation tests were conducted for the same items as in Example B8.

The results are specified in Table 4.

EXAMPLE B13

A laminated film having been provided with a heat-sealing layer was obtained in the same manner as in Example B7 except that the laminated film obtained in Example B12 was used instead of the laminated film obtained in Example B6.

As for the laminated films obtained, evaluation tests were conducted for the same items as in Example B7.

The results are specified in Table 4.

EXAMPLE B14

On the silicon oxide deposited surface of the transparent gas barrier laminated film obtained in Example B3 was coated in the first place as an anchor-coating an urethane type adhesive layer (manufactured by Takeda Chemical Industries, Ltd., a two-component type adhesive comprising mixing TAKELAK A-606 and TAKENAT A-10 in a proportion of 9:1) to form a coat layer having a thickness of 1 μm. Then, a vinylidene type resin latex (manufactured by Kureha Chemical Industry Co., Ltd.; KUREHARON LATEX DO-870) was coated on the coat layer to give a film having a thickness of 10 μm (moisture permeability: 1.2 g/m$^2$·24 hr; referred to hereinafter as "K film"). Thus, a transparent gas barrier laminated plastic film was obtained.

As for the transparent gas barrier laminated film, the moisture permeability and the oxygen permeability were measured in the methods described above and the transparency was evaluated by naked eyes.

The results of the measurements are specified in Table 4.

COMPARATIVE EXAMPLE B4

A transparent gas barrier laminated plastic film was obtained by laminating on the silicon oxide deposited surface of the transparent gas barrier laminated film obtained in Example B3 the same K-OPP as used in Example B6 so that the vinylidene chloride type resin coat layer and the silicon oxide deposited surface and the surface of the polyvinyl alcohol film and an ethylene-vinyl acetate copolymer film (thickness: 40 μm) were contacted respectively through an urethane type adhesive layer having a thickness of 2 μm (manufactured by Takeda Chemical Industries, Ltd., a two-component type adhesive comprising mixing TAKELAK A-606 and TAKENAT A-10 in a proportion of 9:1).

As for the transparent gas barrier laminated film, the moisture permeability and the oxygen permeability were measured and the transparency was evaluated by naked eyes.

The results of the measurements are specified in Table 4.

TABLE 3

| Example No. | Thin Layer Thickness (nm) | Plastic Film Material | Plastic Film Saponification value (mole %) | Plastic Film Dimensional variation rate (%) | Stretch ratio | Total thickness (μm) | Moisture permeability (g/m$^2$·24 hr) | Oxygen permeability (cc/m$^2$·24 hr·atm) | Transparency |
|---|---|---|---|---|---|---|---|---|---|
| Exam. B1 | 100 | PVA[1] | 99.9 | 0.8/0.6 | 3 × 3 | 25 | 2.0 | 0.2 or less | ⊚ |
| Exam. B2 | 100 | PVA | 99.9 | 1.7/0.9 | 3 × 6.3 | 25 | 1.5 | 0.2 or less | ⊚ |
| Exam. B3 | 100 | PVA | 99.9 | 0.4/0.3 | 3 × 6.3 | 25 | 1.0 | 0.2 or less | ⊚ |
| Exam. B4 | 50 | PVA | 99.9 | 0.4/0.3 | 3 × 6.3 | 25 | 1.5 | 0.2 or less | ⊚ |
| Exam. B5 | 200 | PVA | 99.9 | 0.4/0.3 | 3 × 6.3 | 25 | 0.8 | 0.2 or less | ⊚ |
| Comp. Exam. B1 | 100 | PVA | 90.0 | 0.8/0.6 | 3 × 3 | 25 | 50 | 8 | ⊚ |
| Comp. Exam. B2 | 100 | PVA | 99.9 | 3.0/1.5 | 3 × 6.3 | 25 | 4.0 | 0.2 or less | ⊚ |
| Comp. Exam. B3 | 100 | PET[2] | — | — | 3 × 3 | 25 | 8.0 | 5 | ◯ |

[1]PVA: Polyvinyl alcohol.
[2]PET: Polyethylene terephthalate.

TABLE 4

| Example No | Construction of Laminated Films | Total thickness (μm) | Moisture permeability (g/m² · 24 hr) | Oxygen permeability (cc/m² · 24 hr · atm) | Transparency |
| --- | --- | --- | --- | --- | --- |
| Exam. B6 | K-OPP*¹/Film of Example B1 | 57 | 0.15 | 0.2 or less | ⓒ |
| Exam. B7 | K-OPP/Film of Example B1/EVA*² | 99 | 0.2 | 0.2 or less | ⓒ |
| Exam. B8 | K-OPP/Film of Example B3 | 57 | 0.1 | 0.2 or less | ⓒ |
| Exam. B9 | K-OPP/Film of Example B3/EVA | 99 | 0.1 | 0.2 or less | ⓒ |
| Exam. B10 | PET*³/Film of Example B3 | 52 | 0.3 | 0.2 or less | ⓒ |
| Exam. B11 | PET/Film of Example B3/EVA | 94 | 0.35 | 0.2 or less | ⓒ |
| Exam. B12 | ONY*⁴/Film of Example B3 | 42 | 0.5 | 0.2 or less | ⓒ |
| Exam. B13 | ONY/Film of Example B3/EVA | 84 | 0.6 | 0.2 or less | ⓒ |
| Exam. B14 | K film*⁵/Film of Example B3 | 36 | 0.15 | 0.2 or less | ⓒ |
| Comp. Exam. B4 | K-OPP/Film of Comparative Example B3/EVA | 99 | 1.0 | 4 | ⓒ |

*¹K-OPP: Polyvinylidene chloride type resin coated biaxially stretched polypropylene film.
*²EVA: Ethylene-vinyl acetate copolymer film.
*³PET: Biaxially stretched polyethylene terephthalate film.
*⁴ONY: Biaxially stretched nylon 6 film.
*⁵K film. Polyvinylidene chloride type resin film.

EVALUATION OF THE RESULTS OF EXAMPLES B1-B14 and COMPARATIVE EXAMPLES B1-B4

Followings are found from the results specified in Tables 3 and 4:

(i) From the results of Examples B1 to B5, more excellent gas barrier properties are exhibited by using a plastic film which has a saponification value of 99 mole % or more and an excellent dimensional stability.

If another plastic layer is laminated on the thin layer, the moisture permeability is further reduced and much excellent gas barrier properties are exhibited (Examples B6, B8, B10, B12 and B14).

Further, the gas barrier properties were not changed even if a substance for improving heat-sealing properties was laminated (Examples B7, B9, B11 and B13).

(ii) The moisture permeability and the oxygen permeability were not good in cases that a film having a less amount of a polar group was used as a thermoplastic film (Comparative Example B3), that the film having a large dimensional variation rate was used (Comparative Example B2) and that the saponification value was insufficient (Comparative Example B1).

(iii) The laminated films according to the present invention have excellent gas barrier properties and exhibits good transparency.

EXAMPLE C1

A transparent gas barrier laminated film was obtained by evaporating by heating silicon monoxide (SiO) having a purity of 99.9% under a vacuum of $5 \times 10^{-5}$ Torr on the surface of a polyvinyl alcohol film having a saponification value of 99.9% (stretch ratio: $3 \times 3$, biaxially stretched, thickness: 12 μm) and forming a transparent thin silicon oxide layer of a thickness of 100 nm on the one side of a polyvinyl alcohol film.

As for the gas barrier laminated film, the bond energy of silicon (Si2p) of the silicon oxide film layer, the moisture permeability and the oxygen permeability were measured by the aforementioned methods, and the transparency was evaluated by a naked eye.

The results of measurements are specified in FIG. 1 and Table 5.

EXAMPLE C2

A thin silicon oxide layer was formed on the one side of an ethylene-vinyl alcohol copolymer in the same manner as in Example C1 except that the polyvinyl alcohol film having a saponification value of 99.9% was replaced by an ethylene-vinyl alcohol copolymer film (ethylene content: 32 mole %; stretch ratio: $3 \times 3$; biaxially stretched; thickness; 12 μm).

As for the gas barrier laminated film obtained, the same evaluation tests were conducted as in Example C1.

Figure 2:
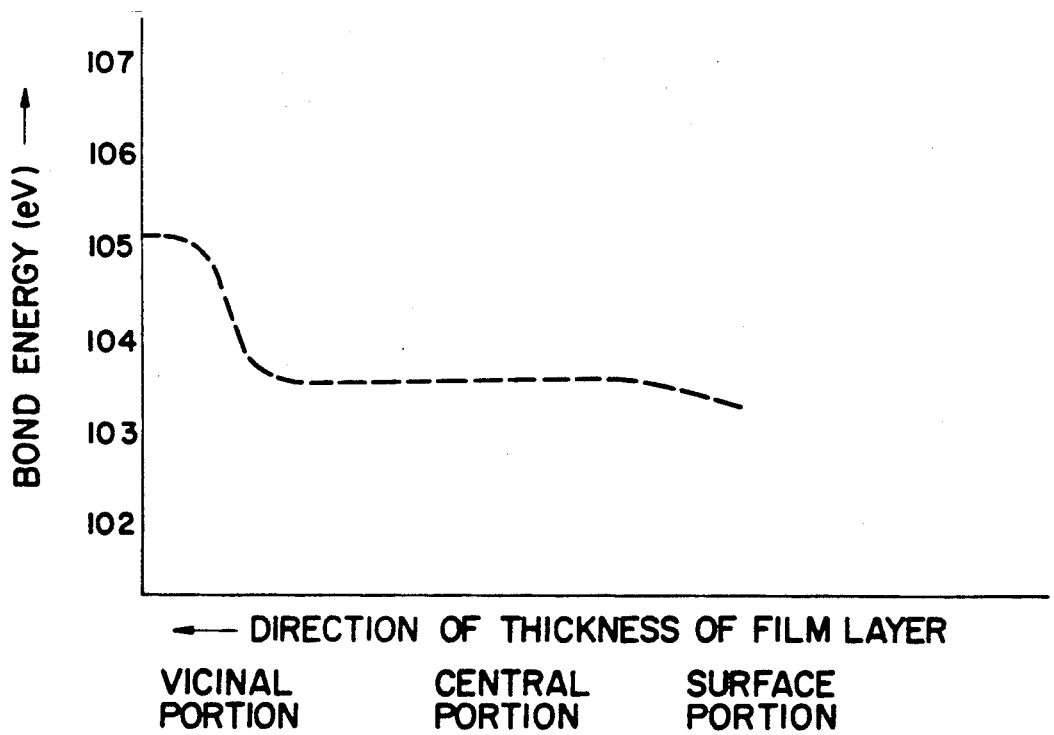
FIG. 2 is a graph which illustrates the variation of the bond energy of silicon to the direction of thickness of the thin silicon oxide layer in the laminated film obtained in Example C2 according to the present invention.

The results of measurements are specified in FIG. 2 and Table 5.

COMPARATIVE EXAMPLE C1

A thin silicon oxide layer was formed on the one side of a polyethylene terephthalate film in the same manner as in Example C1 except that the polyvinyl alcohol film having a saponification value of 99.9% was replaced by a polyethylene terephthalate film (ethylene content: 32 mole %; stretch ratio: $3 \times 3$; biaxially stretched; thickness: 12 μm).

As for the gas barrier laminated film obtained, the same evaluation tests were conducted as in Example C1.

The results of measurements are specified in FIG. 3 and Table 5.

COMPARATIVE EXAMPLE C2

A thin silicon oxide layer was formed on the one side of a polypropylene film in the same manner as in Example C1 except that the polyvinyl alcohol film having a saponification value of 99.9% was replaced by a polypropylene film (stretch ratio: $3 \times 10$; biaxially stretched; thickness: 20 μm).

As for the gas barrier laminated film obtained, the same evaluation tests were conducted as in Example C1.

The results of measurements are specified in FIG. 4 and Table 5.

EXAMPLE C3

A transparent gas barrier laminated plastic film was obtained by laminating on the surface of the deposited silicon oxide of the transparent gas barrier laminated film which had been formed in Example C1 a polypropylene film (stretch ratio: $3 \times 10$; biaxially stretched; thickness: 20 μm; moisture permeability: 8 g/m²·24 hr, referred to hereinafter as "OPP") through an urethane type adhesive layer having a thickness of 2 μm (manufactured by Takeda Chemical Industries, Ltd., a two-component type adhesive comprising mixing TAKELAK A-606 and TAKENATE A-10 in a proportion of 9:1).

As for the transparent gas barrier laminated film, the moisture permeability and the oxygen permeability were measured by the methods described above and the transparency was evaluated by naked eyes.

The results of the measurements are specified in Table 6.

EXAMPLE C4

Using the gas barrier laminated film obtained in Example C3, a transparent gas barrier laminated plastic film was obtained by laminating on the surface of the polyvinyl alcohol film of the above-described laminated film an ethylene-vinyl acetate copolymer having a thickness of 40 μm as a heat-sealing layer through an urethane type adhesive layer having a thickness of 2 μm (manufactured by Takeda Chemical Industries, Ltd., a two-component type adhesive comprising mixing TAKELAK A-606 and TAKENAT A-10 in a proportion of 9:1).

As for the transparent gas barrier laminated film, the moisture permeability and the oxygen permeability were measured by the methods described above and the transparency was evaluated by naked eyes.

The results of the measurements are specified in Table 6.

EXAMPLE C5

A transparent gas barrier laminated plastic layer that the OPP had been adhered and laminated was obtained in the same manner as in Example C1 except that the transparent gas barrier laminated film obtained in Example C2 was used instead of the transparent gas barrier laminated film obtained in Example C1.

As for the gas barrier laminated film obtained, the same evaluation tests were conducted as in Example C3.

The results of measurements are specified in Table 6.

EXAMPLE C6

A transparent gas barrier laminated plastic layer was obtained in the same manner as in Example C3 except that the OPP film laminated on the silicon oxide deposited surface was replaced by a nylon 6 film (stretch ratio: 3×3, biaxially stretched, thickness: 15 μm; moisture permeability: 150 g/m$^2$·24 hr).

As for the gas barrier laminated film obtained, the same evaluation tests were conducted as in Example C3.

The results of measurements are specified in Table 6.

COMPARATIVE EXAMPLES C3

A transparent laminated plastic layer was obtained by laminating on the surface of the deposited silicon oxide of the transparent gas barrier laminated film which had been formed in Comparative Example C1 the same OPP as used in foregoing Example 3 through an urethane type adhesive layer having a thickness of 2 μm (manufactured by Takeda Chemical Industries, Ltd., a two-component type adhesive comprising mixing TAKELAK A-606 and TAKENAT A-10 in a proportion of 9:1).

As for the laminated film, the moisture permeability and the oxygen permeability were measured by the methods described above and the transparency was evaluated by naked eyes.

The results of the measurements are specified in Table 6.

COMPARATIVE EXAMPLE C4

A transparent laminated plastic film was obtained in the same manner as in Comparative Example C3 except that the plastic layer on which the silicon oxide layer had been deposited was replaced by the laminated film obtained in Comparative Example C2.

As for the laminated film obtained, the same evaluation tests as in Example C3 were conducted.

The results of the measurements are specified in Table 6.

TABLE 5

| Example No. | Construction of Laminated Films | | | | Moisture permeability (g/m$^2$·24 hr) | Oxygen permeability (cc/m$^2$·24 hr·atm) | Transparency |
|---|---|---|---|---|---|---|---|
| | Thin silicon oxide layer | | Thickness (μm) | Plastic film material | Total thickness (μm) | | |
| | Bond energy (eV) | | | | | | |
| | Vicinal portion | Central/surface portions | | | | | |
| Exam. C1 | 104.8 | 103.2–103.7 | 100 | PVA[*1] | 12 | 1.5 | 0.2 or less | ⊚ |
| Exam. C2 | 104.9–105.1 | 103.0–103.4 | 100 | EV[*2] | 12 | 1.5 | 0.2 or less | ⊚ |
| Comp. Exam. C1 | 103.1–103.8 | 103.1–103.8 | 100 | PET[*3] | 12 | 6.0 | 5 | ⊚ |
| Comp. Exam. C2 | 103.2 | 103.2 | 100 | PP[*4] | 20 | 4.0 | 10 | ⊚ |

[*1]PVA: Polyvinyl alcohol;
[*2]EV: Ethylene-vinyl alcohol copolymer;
[*3]PET: Polyethylene therphthalate;
[*4]PP: Polypropylene.

TABLE 6

| Example No. | Construction of Laminated Films | Total thickness (μm) | Moisture permeability (g/m$^2$·24 hr) | Oxygen permeability (cc/m$^2$·24 hr·atm) | Transparency |
|---|---|---|---|---|---|
| Exam. C3 | OPP[*1]/Film of Example C1 | 34 | 0.1 | 0.2 or less | ⊚ |
| Exam. C4 | OPP/Film of Example C1/EVA[*2] | 76 | 0.1 | 0.2 or less | ⊚ |
| Exam. C5 | OPP/Film of Example C2 | 34 | 0.3 | 0.2 or less | ⊚ |
| Exam. C6 | ONY[*3]/Film of Example C1 | 29 | 0.5 | 0.2 or less | ⊚ |
| Comp. Exam. C3 | OPP/Film of Comparative Example C1 | 34 | 3.0 | 4 | ⊚ |
| Comp. | OPP/Film of Comparative Example C2 | 42 | 2.0 | 8 | ⊚ |

TABLE 6-continued

| Example No | Construction of Laminated Films | Total thickness (μm) | Moisture permeability (g/m² · 24 hr) | Oxygen permeability (cc/m² · 24 hr · atm) | Transparency |
|---|---|---|---|---|---|
| Exam C4 | | | | | |

*¹OPP: Biaxially stretched polypropylene film.
*²EVA: Ethylene-vinyl acetate copolymer film.
*³ONY: Biaxially stretched nylon 6 film.

EVALUATION OF THE RESULTS OF EXAMPLES AND COMPARATIVE EXAMPLES

Followings are found from the results specified in Tables 5 and 6:

(i) As is shown in FIGS. 1 and 2, in the thin silicon oxide layer formed in the plastic film, when the bond energy of silicon is large in the vicinity of the bonding portion to the plastic film, both the moisture permeability and oxygen permeability are low and the laminated film according to the present invention exhibits excellent gas barrier properties.

If another plastic layer is laminated on the thin layer, the moisture permeability is further reduced and much excellent gas barrier properties are exhibited (Examples C3, C4, C5 and C6).

Further, the gas barrier properties were not changed even if a substance for improving heat-sealing properties was laminated (Example C4).

(ii) As is shown in FIGS. 3 and 4, in the thin silicon oxide layer formed in the plastic film, when the bond energy of silicon in the bonding portion (vicinity) of the plastic film is in the same level as in the central and the surface (Comparative Examples C1 and C2), good moisture permeability and oxygen permeability were not exhibited.

The moisture permeability and the oxygen permeability were not improved sufficiently even if another plastic layer was laminated (Comparative Examples C3 and C4).

(iii) The laminated films according to the present invention have excellent gas barrier properties and exhibit good transparency.

What is claimed is:

1. A gas barrier laminated film comprising a thermoplastic film having a polar group and a thin layer of silicon oxide formed on the one side of the thermoplastic film in which the bond energy of silicon in the thin silicon oxide layer varies along the direction of the thickness of the thin layer and becomes large in the vicinity of the plastic film.

2. A gas barrier laminated film according to claim 1, wherein the thickness of said polyvinyl alcohol film is selected from the range of 5 to 400 μm, and the thickness of the silicon oxide layer is selected from the range of 5 to 500 nm.

3. A gas barrier laminated film according to claim 1, wherein said thin silicon oxide layer is formed by either methods of the vacuum deposition method, the spattering method or the ion-plating method.

4. A gas barrier laminated film according to claim 1, wherein a further plastic layer is laminated on the surface of the thin layer.

5. A gas barrier laminated film according to claim 1, wherein said thermoplastic film is a film of a polyvinyl alcohol having a saponification value of 99% or more, which film is selected from the group consisting of film being stretched at least monoaxially at the stretch ratio of 5 or more and film having dimensional variation rate of 2% or less at a temperature of 120° C.

* * * * *